United States Patent
Taira

(10) Patent No.: US 6,535,608 B1
(45) Date of Patent: Mar. 18, 2003

(54) STEREO BROADCASTING RECEIVING DEVICE

(75) Inventor: Masaaki Taira, Akashi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/577,015

(22) Filed: May 24, 2000

(30) Foreign Application Priority Data

May 24, 1999 (JP) ............................................ 11-143480

(51) Int. Cl.[7] .............................. H04R 5/00; H04H 5/00
(52) U.S. Cl. ................................ 381/2; 381/10; 381/17; 381/18
(58) Field of Search ............................ 381/1–2, 10, 17, 381/18

(56) References Cited

U.S. PATENT DOCUMENTS 5,592,557 A * 1/1997 Chahabadi et al. ........... 381/10
5,671,286 A * 9/1997 Gottfried et al. .............. 381/13

* cited by examiner

*Primary Examiner*—Minsun Oh Harvey
*Assistant Examiner*—Laura A Grier
(74) *Attorney, Agent, or Firm*—Arent Fox Kintner Plotkin & Kahn, PLLC

(57) ABSTRACT

A stereo broadcasting receiving device comprises pseudo stereo signal generation means for generating a pseudo left stereo signal and a pseudo right stereo signal from an L+R signal, first multiplication means for multiplying the pseudo left stereo signal by a first coefficient, second multiplication means for multiplying the pseudo right stereo signal by the first coefficient, third multiplication means for multiplying the L+R signal by a second coefficient, fourth multiplication means for multiplying an L−R signal by a third coefficient, coefficient determination means for determining the first coefficient, the second coefficient, and the third coefficient on the basis of the result of judgment in receiving state judgment means, means for generating a left stereo output signal on the basis of an output signal of the first multiplication means, an output signal of the third multiplication means, and an output signal of the fourth multiplication means, and means for generating a right stereo output signal on the basis of an output signal of the second multiplication means, the output signal of the third multiplication means, and the output signal of the fourth multiplication means.

4 Claims, 4 Drawing Sheets

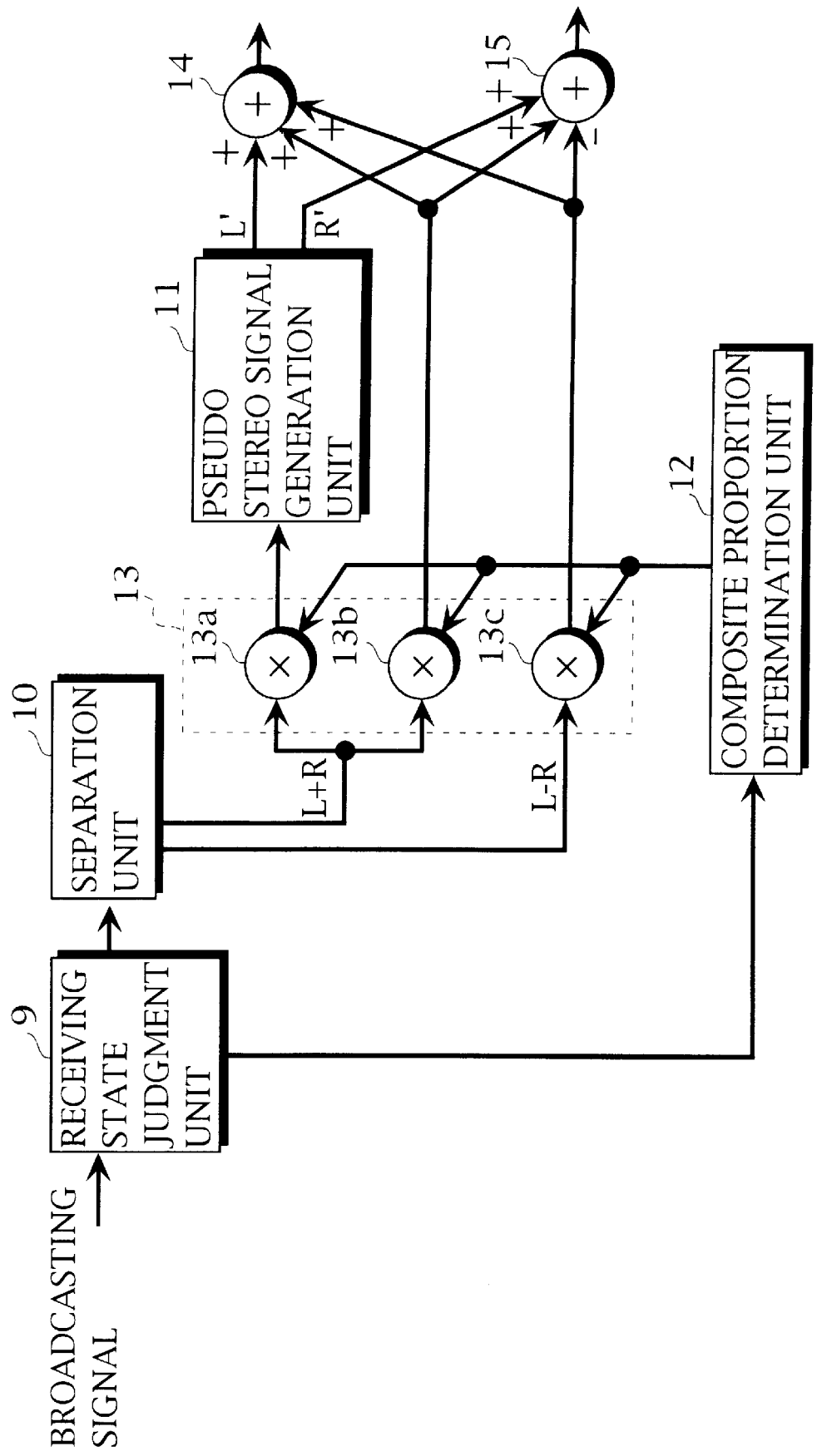

STEREO BROADCASTING RECEIVING DEVICE

BACKGROUND OF THE INVENTION

1. Field of the Invention

The present invention relates to stereo broadcasting receiving devices for receiving stereo broadcasting such as FM broadcasting.

2. Description of Prior Art

In FM broadcasting, an L+R signal (a main channel signal) obtained by adding a left stereo signal and a right stereo signal and an L−R signal (a sub-channel signal) obtained by subtracting the right stereo signal from the left stereo signal generally constitute a broadcasting signal. Specifically, a composite wave signal having an L+R signal, a double sideband signal obtained by amplitude-modulating a sub-carrier (38 KHz) using an L−R signal and suppressing a carrier, and a pilot signal arranged, respectively, at a frequency of 50 to 15000 Hz, a frequency of 23 to 53 KHz, and a frequency of 19 KHz is taken as a broadcasting signal.

In order to take out a left stereo output signal (an L signal) and a right stereo output signal (an R signal) from the broadcasting signal, addition and subtraction of the L+R signal and the L−R signal may be performed.

When frequency modulation (FM modulation) is performed, so-called triangular noise, centered around the frequency of the carrier is produced. The higher the frequency is, the larger the triangular noise is. When the receiving level of the broadcasting signal is low, therefore, the L−R signal conveyed at a frequency higher than that of the pilot signal must be attenuated. When the L−R signal is attenuated, however, the degree of separation between the right and left stereo signals is decreased. That is, separation of the L and R signals is performed by addition and subtraction of the L+R signal and the L−R signal, i.e., (L+R)+(L−R)=2L and (L+R)−(L−R)=2R. When the L−R signal is attenuated, therefore, the R signal leaks out to the L signal, while the L signal leaks out to the R signal, so that the degree of separation is decreased.

JP-A-6-315016 discloses a noise reducing circuit for preventing the degree of separation of right and left stereo signals from being decreased when the receiving state gets worse.

The noise reducing circuit described in JP-A-6-315016 comprises a stereo separating circuit for performing addition and subtraction of an L+R signal and an L−R signal to take out an L signal and an R signal, an attenuating circuit for attenuating the L−R signal, a storage for storing digital data representing the relationship between the receiving level of a desired station signal and the amount of attenuation of the L−R signal, a desired station signal level detection circuit for detecting the receiving level of the desired station signal, and control means for reading out the data stored in the storage on the basis of the detected receiving level of the desired station signal and controlling the amount of attenuation in the attenuating circuit on the basis of the data read out.

In the invention described in JP-A-6-315016, when the receiving state of a broadcasting signal is bad, however, the L−R signal is attenuated to improve the S/N ratio. Accordingly, the L signal and the R signal cannot be separated from each other and taken out, and only the demodulation of a monophonic signal can be realized. Particularly in an on-vehicle FM receiving device, the receiving state may get worse in many cases as the vehicle travels. In such a case, a sound field having a broadening feeling cannot be reproduced, which does not give listeners entire satisfaction.

SUMMARY OF THE INVENTION

An object of the present invention is to provide a stereo broadcasting receiving device capable of ensuring stereo broadcasting even if the receiving state is bad and reproducing a sound field having a broadening feeling.

A first stereo broadcasting receiving device according to the present invention is characterized by comprising receiving means for receiving a broadcasting signal having an L+R signal obtained by adding a left stereo signal and a right stereo signal and an L−R signal obtained by subtracting the right stereo signal from the left stereo signal; separation means for separating the broadcasting signal received by the receiving means into the L+R signal and the L−R signal; pseudo stereo signal generation means for generating a pseudo left stereo signal and a pseudo right stereo signal from the L+R signal obtained by the separation in the separation means; first multiplication means for multiplying the pseudo left stereo signal by a first coefficient; second multiplication means for multiplying the pseudo right stereo signal by the first coefficient; third multiplication means for multiplying the L+R signal obtained by the separation in the separation means by a second coefficient; fourth multiplication means for multiplying the L−R signal obtained by the separation in the separation means by a third coefficient; receiving state judgment means for judging the receiving state of the broadcasting signal received by the receiving means; coefficient determination means for determining the first coefficient, the second coefficient, and the third coefficient on the basis of the result of the judgment in the receiving state judgment means; means for generating a left stereo output signal on the basis of an output signal of the first multiplication means, an output signal of the third multiplication means, and an output signal of the fourth multiplication means; and means for generating a right stereo output signal on the basis of an output signal of the second multiplication means, the output signal of the third multiplication means, and the output signal of the fourth multiplication means.

The coefficient determination means determines the ratio of the first coefficient, the second coefficient, and the third coefficient to be n (n>0):0:0 when the receiving state judgment means judges that the receiving state is bad.

A second stereo broadcasting receiving device according to the present invention is characterized by comprising receiving means for receiving a broadcasting signal having an L+R signal obtained by adding a left stereo signal and a right stereo signal and an L−R signal obtained by subtracting the right stereo signal from the left stereo signal; separation means for separating the broadcasting signal received by the receiving means into the L+R signal and the L−R signal; first multiplication means for multiplying the L+R signal obtained by the separation in the separation means by a first coefficient; second multiplication means for multiplying the L+R signal obtained by the separation in the separation means by a second coefficient; third multiplication means for multiplying the L−R signal obtained by the separation in the separation means by a third coefficient; pseudo stereo signal generation means for generating from an output signal of the first multiplication means a pseudo stereo signal comprising a pseudo left stereo signal and a pseudo right stereo signal; receiving state judgment means for judging the receiving state of the broadcasting signal received by the receiving means; coefficient determination means for determining the first coefficient, the second coefficient, and the third coefficient on the basis of the result of the judgment in the receiving state judgment means; means for generating a left stereo output signal on the basis of the pseudo left stereo signal, an output signal of the second multiplication means, and the output signal of the third multiplication means; and means for generating a right stereo output signal on the basis of the pseudo right stereo signal, an output signal of the second multiplication means, and the output signal of the third multiplication means.

The coefficient determination means determines the ratio of the first coefficient, the second coefficient, and the third coefficient to be n (n>0):0:0 when the receiving state judgment means judges that the receiving state is bad.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing another example of the configuration of the multiplexer unit.

DETAILED DESCRIPTION OF THE PREFERRED EMBODIMENTS

Figure 1:
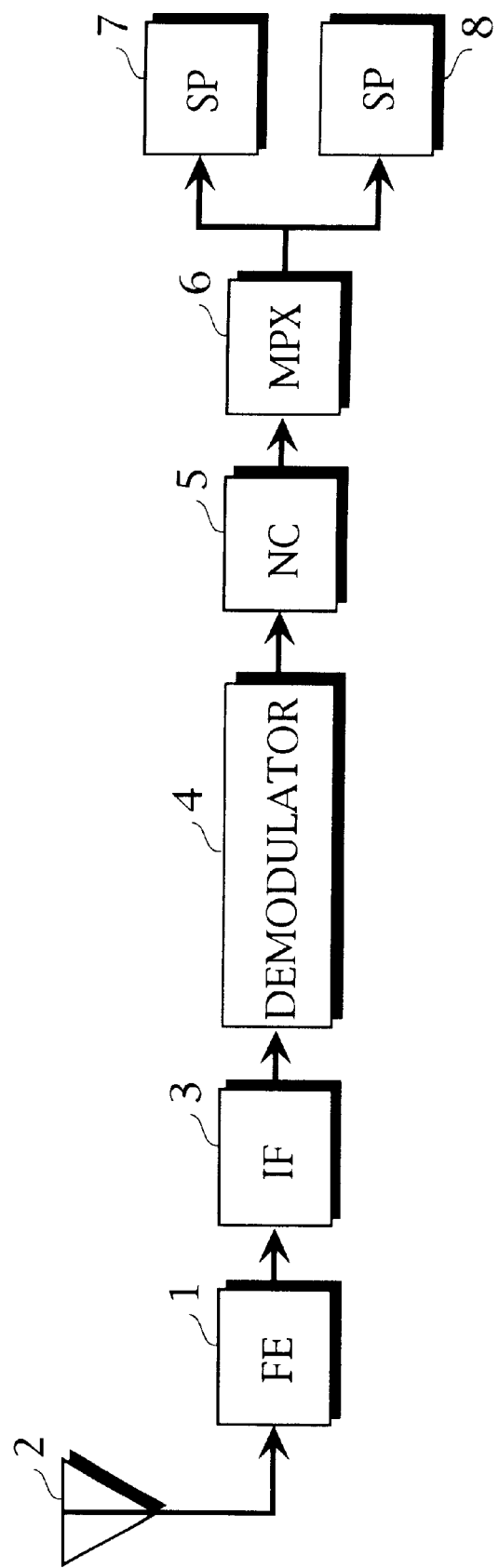
FIG. 1 is a block diagram showing the schematic configuration of an FM receiving device.

FIG. 1 illustrates the schematic configuration of an FM receiving device.

Reference numeral 1 denotes a front end unit (FE) for selectively receiving an FM signal received by an antenna 2 and amplifying the received FM signal at a high frequency. Reference numeral 3 denotes an intermediate frequency amplification unit (IF) for converting the frequency of the signal received by the front end unit (FE) into an intermediate frequency (10.7 MHz) and amplifying the intermediate frequency.

Reference numeral 4 denotes an FM demodulation unit (demodulator) for taking out a modulation signal from an FM signal obtained by the intermediate frequency amplification unit (IF) 3. Reference numeral 5 denotes a noise canceller for canceling noise superimposed on a demodulation signal obtained by the demodulation unit 4. Reference numeral 6 denotes a multiplexer unit (MPX) for separating the demodulation signal from which the noise has been canceled into a left stereo output signal and a right stereo output signal.

The left stereo output signal obtained by the multiplexer unit (MPX) 6 is fed to a left speaker (SP) 7 and the right stereo output signal obtained by the multiplexer unit (MPX) 6 is fed to a right speaker (SP) 8.

Figure 2:
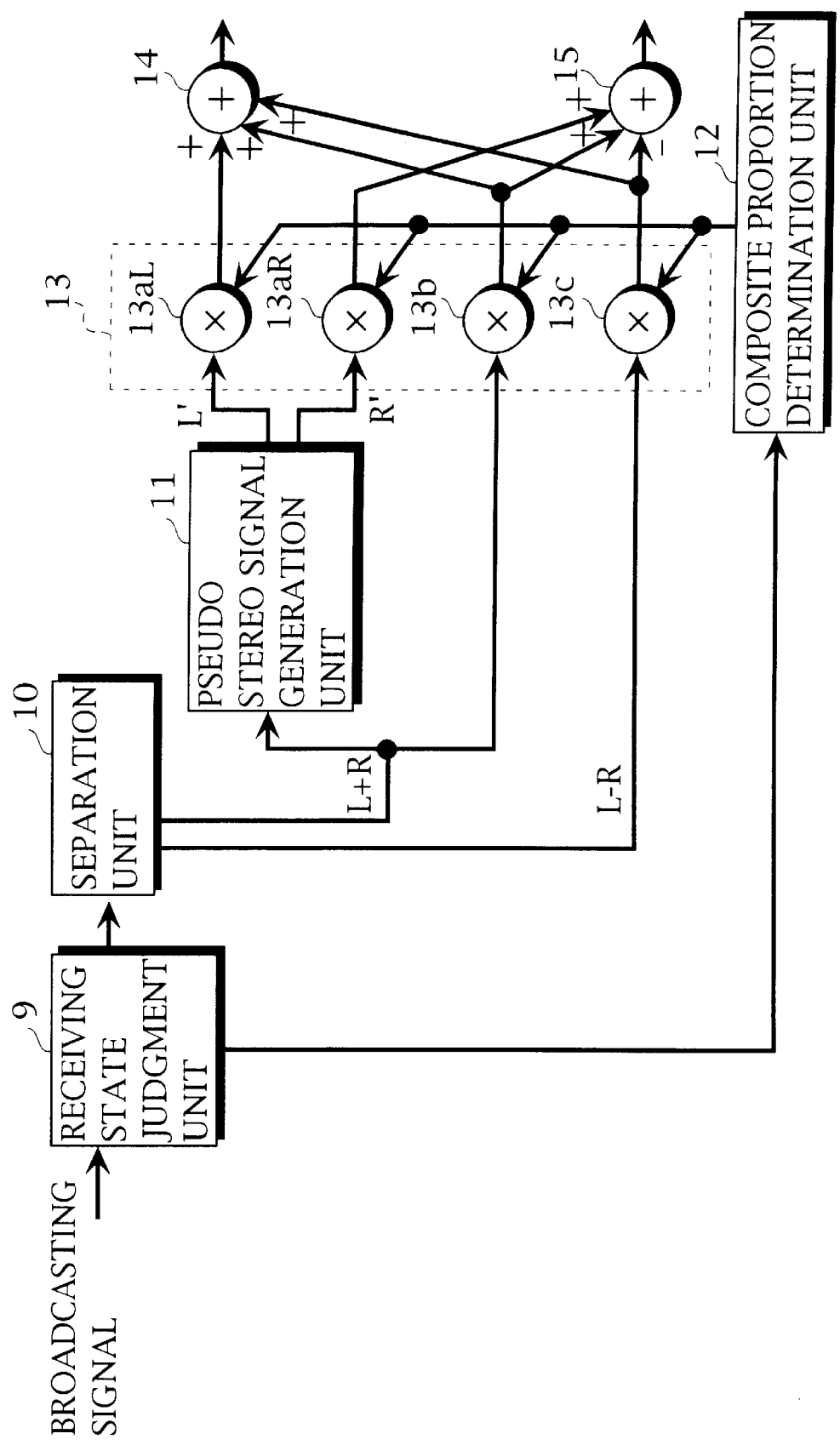
FIG. 2 is a block diagram showing the configuration of a multiplexer unit shown in FIG. 1.

FIG. 2 illustrates the detailed configuration of the multiplexer unit (MPX) 6.

Reference numeral 9 denotes a receiving state judgment unit for judging whether the receiving state of a received broadcasting signal is good or bad, that is, whether the receiving level is high or low. Reference numeral 10 denotes a separation unit for separating the broadcasting signal into an L+R signal and an L−R signal. Reference numeral 11 denotes a pseudo stereo signal generation unit for generating a pseudo stereo signal comprising a pseudo left stereo signal L' and a pseudo right stereo signal R' from the L+R signal obtained by the separation in the separation unit 10.

Reference numeral 12 denotes a composite proportion determination unit for determining composite proportions a, b, and c of the pseudo stereo signal, the L+R signal, and the L−R signal on the basis of the result of the judgment of the receiving state in the receiving state judgment unit 9. Reference numeral 13 denotes a coefficient multiplication portion for respectively multiplying the pseudo stereo signal, the L+R signal and the L−R signal by coefficients corresponding to the composite proportions a, b, and c which have been determined by the composite proportion determination unit 12.

The coefficient multiplication unit 13 comprises a multiplier 13aL for multiplying the pseudo left stereo signal L' by the first coefficient a, a multiplier 13aR for multiplying the pseudo right stereo signal R' by the first coefficient a, a multiplier 13b for multiplying the L+R signal by the second coefficient b, and a multiplier 13c for multiplying the L−R signal by the third coefficient c.

Reference numeral 14 denotes a first operation unit for adding the pseudo left stereo signal L' which has been multiplied by the coefficient a, the L+R signal which has been multiplied by the coefficient b, and the L−R signal which has been multiplied by the coefficient c, to generate a left stereo output signal. Reference numeral 15 denotes a second operation unit for adding the pseudo right stereo signal R' which has been multiplied by the coefficient a and the L+R signal which has been multiplied by the coefficient b as well as subtracting the L−R signal which has been multiplied by the coefficient c from the result of the addition, to generate a right stereo output signal.

Figure 3:
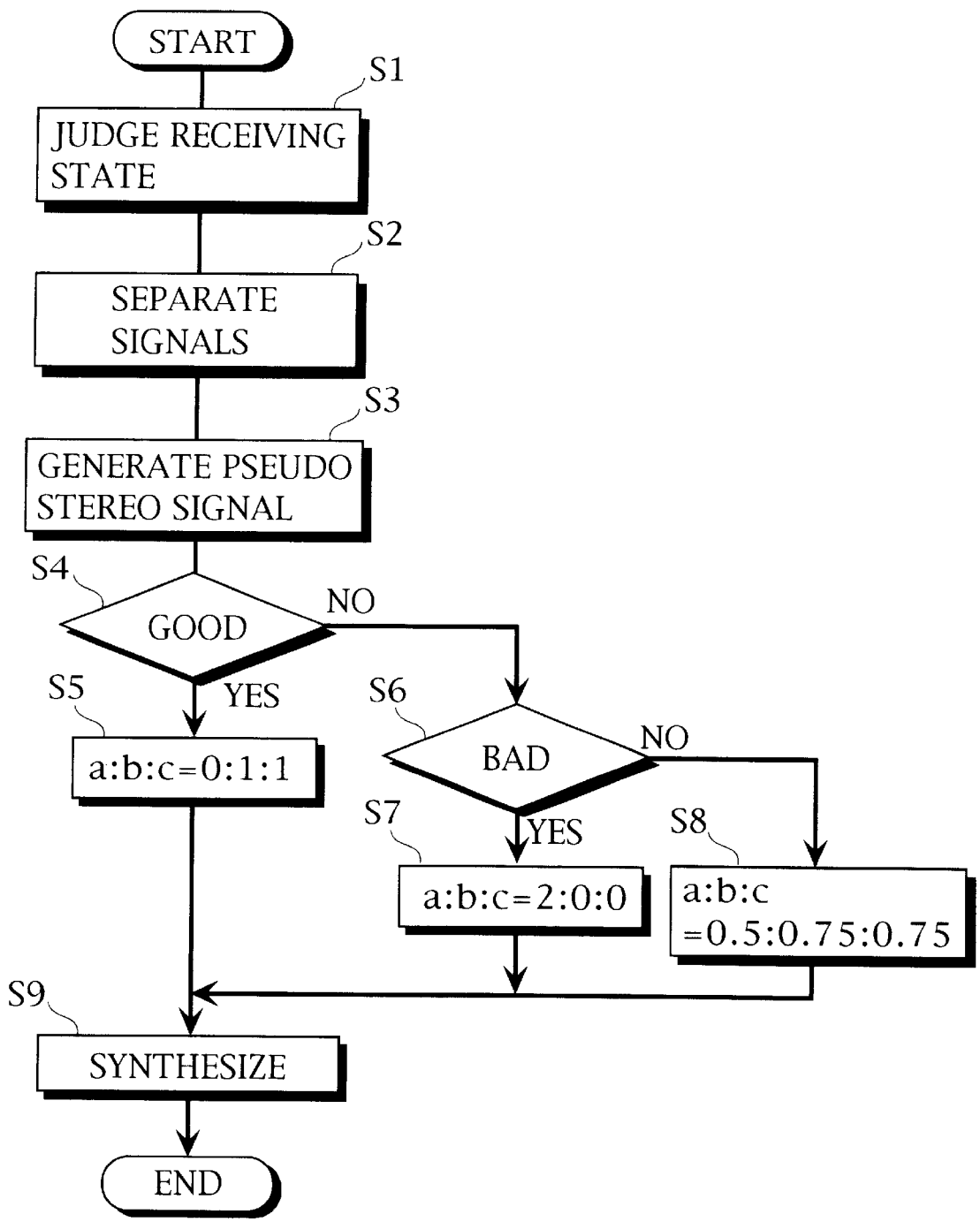
FIG. 3 is a flow chart showing the procedure for operations of the multiplexer unit.

FIG. 3 shows the procedure for operations of the multiplexer unit (MPX) 6.

At the step S1, the receiving state is judged by the receiving state judgment unit 9. Specifically, it is judged which of a state where the receiving level is high and the receiving sensitivity is good, a state where the receiving level is low and the receiving sensitivity is bad, and a state intermediate therebetween occurs.

At the step S2, an L+R signal and an L−R signal are separated from each other by the separation unit 10. At the step S3, a pseudo stereo signal comprising a pseudo left stereo signal L' and a pseudo right stereo signal R' is generated from the L+R signal by the pseudo stereo signal generation unit 11.

At the step S4, it is judged whether or not the receiving state is good as the result of the judgment at the step S1. When it is judged that the receiving state is good, the program proceeds to the step S5. At the step S5, the ratio of the first coefficient a, the second coefficient b, and the third coefficient c is set to a:b:c=0:1:1 by the composite proportion determination unit 12.

When it is judged at the step S4 that the receiving sensitivity is not good, the program proceeds to the step S6. At the step S6, it is judged whether or not the receiving sensitivity is bad. When it is judged at the step S6 that the receiving sensitivity is bad, the program proceeds to the step S7. At the step S7, the ratio of the first coefficient a, the second coefficient b, and the third coefficient c is set to a:b:c=2:0:0 by the composite proportion determination unit 12.

When it is judged at the step 6 that the sensitivity is not bad, that is, the receiving sensitivity is neither good nor bad, that is, is intermediate, the program proceeds to the step S8 At the step S8, the ratio of the first coefficient a, the second coefficient b, and the third coefficient c is set to a:b:c= 0.5:0.75:0.75 by the composite proportion determination unit 12.

At the step S9, a left stereo output signal and a right stereo output signal are generated on the basis of the coefficients a, b, and c set at any one of the step S5, the step S7, and the step S8 and the pseudo stereo signals L' and R', and the L+R signal and the L−R signal.

Specifically, when the coefficients set at any one of the steps S5, S7, and S8 are first taken as a, b, and c, the pseudo left stereo signal L' and the pseudo right stereo signal R' are multiplied by the coefficient a, the L+R signal is multiplied by the coefficient b, and the L+R signal is multiplied by the coefficient c by the coefficient multiplication unit 13.

The pseudo left stereo signal L' which has been multiplied by the coefficient a, the L+R signal which has been multiplied by the coefficient b, and the L−R signal which has been multiplied by the coefficient c are then added by the first operation unit 14, so that a left stereo output signal is generated. Further, the pseudo right stereo signal R' which has been multiplied by the coefficient a and the L+R signal which has been multiplied by the coefficient b are added by the second operation unit 15, and the L−R signal which has been multiplied by the coefficient c is subtracted from the result of the addition by the second operation unit 15, so that a right stereo output signal is generated.

The above-mentioned operations are repeatedly performed, thereby making it possible to generate a pseudo right stereo output signal and a pseudo left stereo output signal as well as to ensure the broadening of sound even when the receiving level of the broadcasting signal is low and the receiving sensitivity is bad.

Description is made of a specific example of a method of determining the coefficients a, b, and c.

Let x be an amount proportional to the receiving level (for example, field strength), and let $\alpha$ and $\beta$ ($\alpha > \beta$) be an upper-limit threshold and a lower-limit threshold for dividing the receiving level into three stages.

The coefficients a, b, and c in cases where $x \geq \alpha$, $x \leq \beta$, and $\alpha > x > \beta$ are found by the following equation (1):

if $x \geq \alpha$ a:b:c=0:1:1 if $x \leq \beta$ a:b:c=2:0:0 if $\alpha > x > \beta$ a:b:c=2($\alpha$−x)/($\alpha$−$\beta$):(x−$\beta$)/($\alpha$−$\beta$):(x−$\beta$)/($\alpha$−$\beta$)     (1)

FIG. 4 illustrates another example of the configuration of the multiplexer unit (MPX) 6.

A receiving state judgment unit 9 judges whether the receiving state of a received broadcasting signal is good or bad, that is, whether the receiving level is high or low. A separation unit 10 separates the broadcasting signal into an L+R signal and an L−R signal.

A composite proportion determination unit 12 determines composite proportions a, b, and c of a pseudo stereo signal, the L+R signal, and the L−R signal on the basis of the result of the judgment of the receiving state in the receiving state judgment unit 9. The composite proportion determination unit 12 determines the proportions a, b, and c in the same method as that in the composite proportion determination unit 12 shown in FIG. 2.

A coefficient multiplication unit 13 comprises a first multiplier 13a, a second multiplier 13b, and a third multiplier 13c. The first multiplier 13a multiplies the L+R signal obtained by the separation in the separation unit 10 by the first coefficient a. The second multiplier 13b multiples the L+R signal obtained by the separation in the separation unit 10 by the second coefficient b. The third multiplier 13c multiplies the L−R signal obtained by the separation unit 10 by the third coefficient c.

An output signal of the first multiplier 13a, that is, a signal obtained by multiplying the L+R signal by the coefficient a is fed to a pseudo stereo signal generation unit 11. The pseudo stereo signal generation unit 11 generates a pseudo stereo signal comprising a pseudo left stereo signal L' and a pseudo right stereo signal R' from an output signal of the first multiplier 13a.

A first operation unit 14 adds the pseudo left stereo signal L' generated by the pseudo stereo signal generation unit 11, an output signal of the second multiplier 13b (the L+R signal which has been multiplied by the coefficient b), and an output signal of the third multiplier 13c (the L−R signal which has been multiplied by the coefficient c), to generate a left stereo output signal.

A second operation unit 15 adds the pseudo right stereo signal R' generated by the pseudo stereo signal generation unit 11 and the output signal of the second multiplier 13b (the L+R signal which has been multiplied by the coefficient b), and subtracts the output signal of the third multiplier 13c (the L−R signal which has been multiplied by the coefficient c) from the result of the addition, to generate a right stereo output signal.

Although in the above-mentioned embodiment, the receiving state is judged in three stages, the present invention is not limited to the same.

According to the present invention, it is possible to ensure stereo broadcasting even if the receiving state is bad as well as to reproduce a sound field having a broadening feeling.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stereo broadcasting receiving device comprising:
   receiving means for receiving a broadcasting signal having an L+R signal obtained by adding a left stereo signal and a right stereo signal and an L−R signal obtained by subtracting the right stereo signal from the left stereo signal;
   separation means for separating the broadcasting signal received by the receiving means into the L+R signal and the L−R signal;
   pseudo stereo signal generation means for generating a pseudo left stereo signal and a pseudo right stereo signal from the L+R signal obtained by the separation in the separation means;
   first multiplication means for multiplying the pseudo left stereo signal by a first coefficient;
   second multiplication means for multiplying the pseudo right stereo signal by the first coefficient;
   third multiplication means for multiplying the L+R signal obtained by the separation in the separation means by a second coefficient;

fourth multiplication means for multiplying the L−R signal obtained by the separation in the separation means by a third coefficient;

receiving state judgment means for judging the receiving state of the broadcasting signal received by the receiving means;

coefficient determination means for determining the first coefficient, the second coefficient, and the third coefficient on the basis of the result of the judgment in the receiving state judgment means;

means for generating a left stereo output signal on the basis of an output signal of the first multiplication means, an output signal of the third multiplication means, and an output signal of the fourth multiplication means; and means for generating a right stereo output signal on the basis of an output signal of the second multiplication means the output signal of the third multiplication means, and the output signal of the fourth multiplication means.

2. The stereo broadcasting receiving device according to claim 1, wherein the coefficient determination means determines the ratio of the first coefficient, the second coefficient, and the third coefficient to be n (n>0):0:0 when the receiving state judgment means judges that the receiving state is bad.

3. A stereo broadcasting receiving device comprising:

receiving means for receiving a broadcasting signal having an L+R signal obtained by adding a left stereo signal and a right stereo signal and an L−R signal obtained by subtracting the right stereo signal from the left stereo signal;

separation means for separating the broadcasting signal received by the receiving means into the L+R signal and the L−R signal;

first multiplication means for multiplying the L+R signal obtained by the separation in the separation means by a first coefficient;

second multiplication means for multiplying the L+R signal obtained by the separation in the separation means by a second coefficient;

third multiplication means for multiplying the L−R signal obtained by the separation in the separation means by a third coefficient;

pseudo stereo signal generation means for generating from an output signal of the first multiplication means a pseudo stereo signal comprising a pseudo left stereo signal and a pseudo right stereo signal;

receiving state judgment means for judging the receiving state of the broadcasting signal received by the receiving means;

coefficient determination means for determining the first coefficient, the second coefficient, and the third coefficient on the basis of the result of the judgment in the receiving state judgment means;

means for generating a left stereo output signal on the basis of the pseudo left stereo signal, an output signal of the second multiplication means, and an output signal of the third multiplication means; and means for generating a right stereo output signal on the basis of the pseudo right stereo signal, an output signal of the second multiplication means, and the output signal of the third multiplication means.

4. The stereo broadcasting receiving device according to claim 3, wherein the coefficient determination means determines the ratio of the first coefficient, the second coefficient, and the third coefficient to be n (n>0):0:0 when the receiving state judgment means judges that the receiving state is bad.

* * * * *